United States Patent [19]

Oelte

[11] 4,238,027
[45] Dec. 9, 1980

[54] WEIGHING APPARATUS FOR WEIGHING CONVEYED PRODUCTS

[75] Inventor: Burkhard Oelte, Schwaebisch Hall, Fed. Rep. of Germany

[73] Assignee: Optima-Maschinenfabrik, Dr. Beuhler GmbH & Co., Fed. Rep. of Germany

[21] Appl. No.: 960,675

[22] Filed: Nov. 14, 1978

[30] Foreign Application Priority Data

Nov. 23, 1977 [DE] Fed. Rep. of Germany ....... 2752193

[51] Int. Cl.$^3$ ............................................ G01G 11/00
[52] U.S. Cl. .................................. 198/504; 198/570; 65/160; 177/50
[58] Field of Search ............... 198/504, 505, 570, 440; 414/21; 177/50, 120; 65/29, 160, 164

[56] References Cited

U.S. PATENT DOCUMENTS

| | | | |
|---|---|---|---|
| 2,905,310 | 9/1959 | Stoeckel et al. | 198/504 |
| 3,955,665 | 5/1976 | Pettis et al. | 198/505 |
| 4,122,940 | 10/1978 | Hoffmann | 198/504 |

Primary Examiner—Joseph E. Valenza
Attorney, Agent, or Firm—Steele, Gould & Fried

[57] ABSTRACT

The weighing apparatus is of the conveyor type and is supplied by a forwarding conveyor from which products are transferred, by a transfer conveyor to the weighing conveyor and from there to a discharge conveyor. The apparatus weighs only selected ones of the products arriving on the forwarding conveyor; and, for this purpose, comprises a support conveyor to support the selected articles while in transfer to prevent their coming into contact with the weighing conveyor.

15 Claims, 3 Drawing Figures

WEIGHING APPARATUS FOR WEIGHING CONVEYED PRODUCTS

DESCRIPTION

The invention relates to a weighing apparatus having a weighing table for weighing conveyed products.

German Offenlegungsschrift No. 25 48 988 corresponding to U.S. Pat. No. 4,122,940 describes an apparatus which is provided particularly for the weighing of highly tempered glass products shortly after they have been formed. The products are transferred from a forwarding conveyor, by way of a weighing table comprising a weighing endless belt, to a discharge conveyor which extends at an angle to the forwarding conveyor, and a transfer conveyor is provided which passes between the two conveyors and the weighing belt. This apparatus renders it possible to weigh the products reliably and continuously even with unfavourable external conditions, and at a relatively high rate which (dependent upon the size of the products) lies in the region of 120 products per minute.

However, automatic glass-article manufacturing machines, such as automatic glass blowers, frequently achieve an output of approximately 300 products per minute, and with these machines the weighing operation is still required to supply the machine control signal, that is, the automatic machine should be regulated in dependence upon any change in the weight of the manufactured products, e.g. as to the size of the globule of glass required for each glass article.

Thus, the object of the invention is to provide a weighing apparatus which renders it possible to detect changes in the weight of products even when very large numbers of the products are produced per unit of time.

In accordance with the invention, this object is achieved by a support conveyor having portions which support or carry some of the products whilst the line of products runs across the station of the weighing table.

Thus, some of the products are guided across the weighing table by the support device without loading the weighing table itself. Only some of the products, such as every second, third or fourth product, load the weighing table and initiate a weighing operation. Since these automatic manufacturing machines are relatively slow to effect a weight adjustment, it is of no consequence that the control signal is only produced by a fraction of the products. If the automatic machine should not be sufficiently slow in effecting a weight adjustment, this can be compensated for by a corresponding damping device in the control system.

Although special advantages reside in using a weighing operation as a signal for regulating an automatic manufacturing machine, it is, however also possible to use the weighing apparatus in other weighing operation, such as in the regulation of filling devices or for continuously checking the weight of products without a control feedback being provided.

Preferably, the weighing apparatus can have at least one endless support member which extends substantially parallel to the weighing table. Preferably, the portions of the support conveyor which carry some of the products can then extend somewhat above the plane of the weighing table and, in a preferred embodiment, can have projections which pass above and across the weighing table.

The weighing table may be of the conveying type e.g. an endless conveyor comprising one or more endless members. In this case, the construction need not be substantially increased in size by the support conveyor, and the products are securely supported. Furthermore, the projections overlying the weighing table protect against the action of heat the products standing on the support conveyor, this being of importance when the products involved are products having a high temperature, such as is the case when automatic glass-blowing machines are being used.

The embodiment having a weighing conveyor and a support conveyor is particularly preferred and it is also particularly versatile. However, the apparatus can also be used in the case of weighing tables having a table which is immovable in a horizontal direction. Thus, a line of products might be fed by a continuously or intermittently driven drum having a plurality of chambers which have bottoms to act as a support device, whilst individual ones of these chambers do not have a bottom, so that the products then act upon the weighing table.

When the period of time during which the products are carried by the support conveyor is sufficiently long to perform an additional weighing cycle, adjustment or calibration can be undertaken during this "rest period" of the balance. This adjustment is necessary relatively frequently in many cases of application since, in the case of, for example, automatic glass-blowing machines, the weight of the weighing table changes as a result of dirt which is caked thereon. Advantageously, however, when the balance is utilized to an optimum, it is also possible to re-calibrate or readjust the weighing apparatus during operation without shutting down the manufacturing machine or producing waste, whereas, in conventional apparatus, a gap had to be created in the line of products for the purpose of calibration, that is, a large number of products had to be ejected from the conveyor upstream of the weighing apparatus and were thus destroyed.

Preferably, the weighing apparatus in accordance with the invention has an actuable lifting device which can also carry the products normally loading the weighing apparatus. The lifting devices can be in the form of slide bars which, for example, are arranged one on each side of the weighing table. The calibration operation is then initiated by actuation of this lifting device, so that the weighing belt is not loaded for a certain period of time. The desired weight for calibration can be a built-in one and need not be one applied externally on the weighing table, thus no special working operations are required for this purpose, and the regulating device can perform the calibration operation automatically and in a remotely controlled manner. By way of example, calibration can be preprogrammed in the control programme at specific intervals of time.

The present invention is further described, by way of example, with reference to the accompanying drawings in which.

Figure 1:
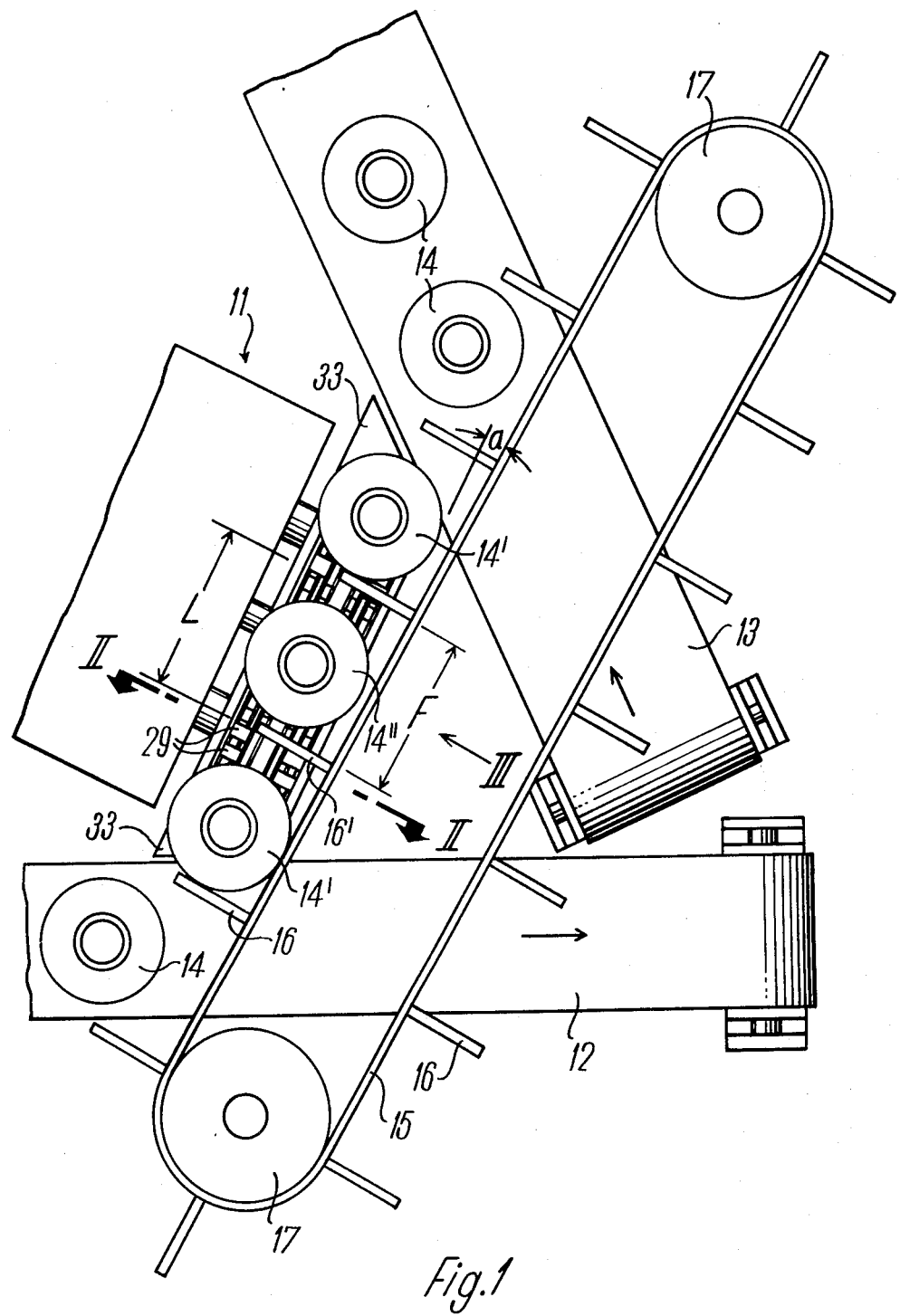
FIG. 1 is a plan view of a weighing apparatus in accordance with the invention.
Figure 2:
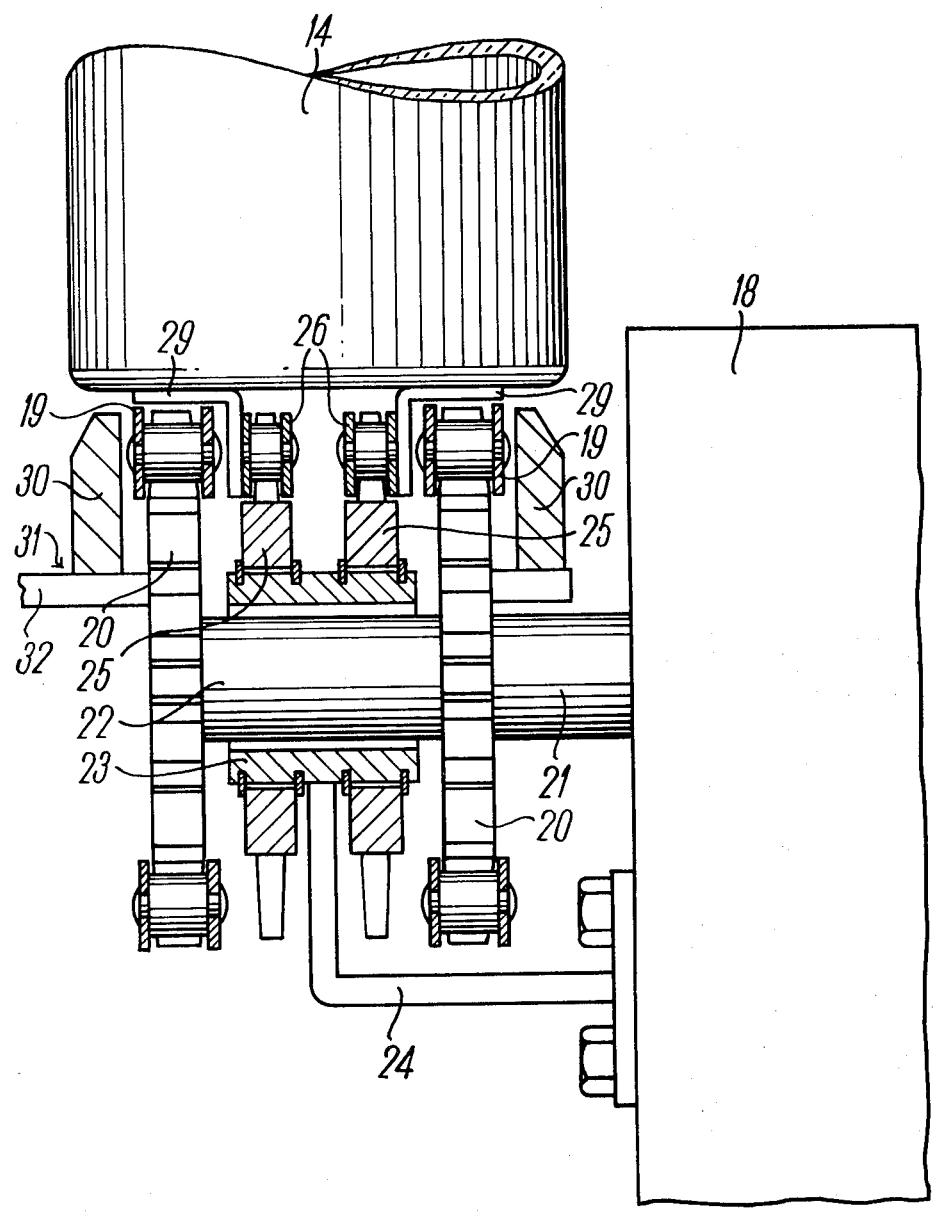
FIG. 2 is a section taken on the line II—II of FIG. 1.

The weighing apparatus 11 is arranged in the angle formed between a feed or forwarding endless belt conveyor 12 and a discharge endless belt conveyor 13 on which products 14, glass containers in the embodiment illustrated, are conveyed shortly after they have been formed by blowing. The feed conveyor 12 comes directly from an automatic glass-blowing machine, and the discharge conveyor 13 conveys the products to a cooling oven. As is described in German Offenlegungsschrift 25 48 988, a transfer conveyor 15 in the form of a finger-type chain conveyor extends across the conveyors 12, 13. The chain provided with fingers 16 runs around wheels 17 having vertical axes. Articles conveyed on the feed conveyor 12 enter portions formed between the fingers 16. The fingers 16 then push the articles obliquely downwardly from the feed conveyor 12 and across the weighing apparatus.

The weighing apparatus 11 has a conventional weighing compartment 18 which is shielded from heat and dirt and which includes an electronic weighing system which supplies an electrical output signal corresponding to the weighing result. The weighing table comprises a weighing conveyor 19 which, in the illustrated embodiment, comprises two endless chains which run parallel to one another over two pairs of sprocket wheels 20 whose shafts 21 are journalled in the weighing compartment 18. One of the two shafts 21 is driven.

Figure 3:
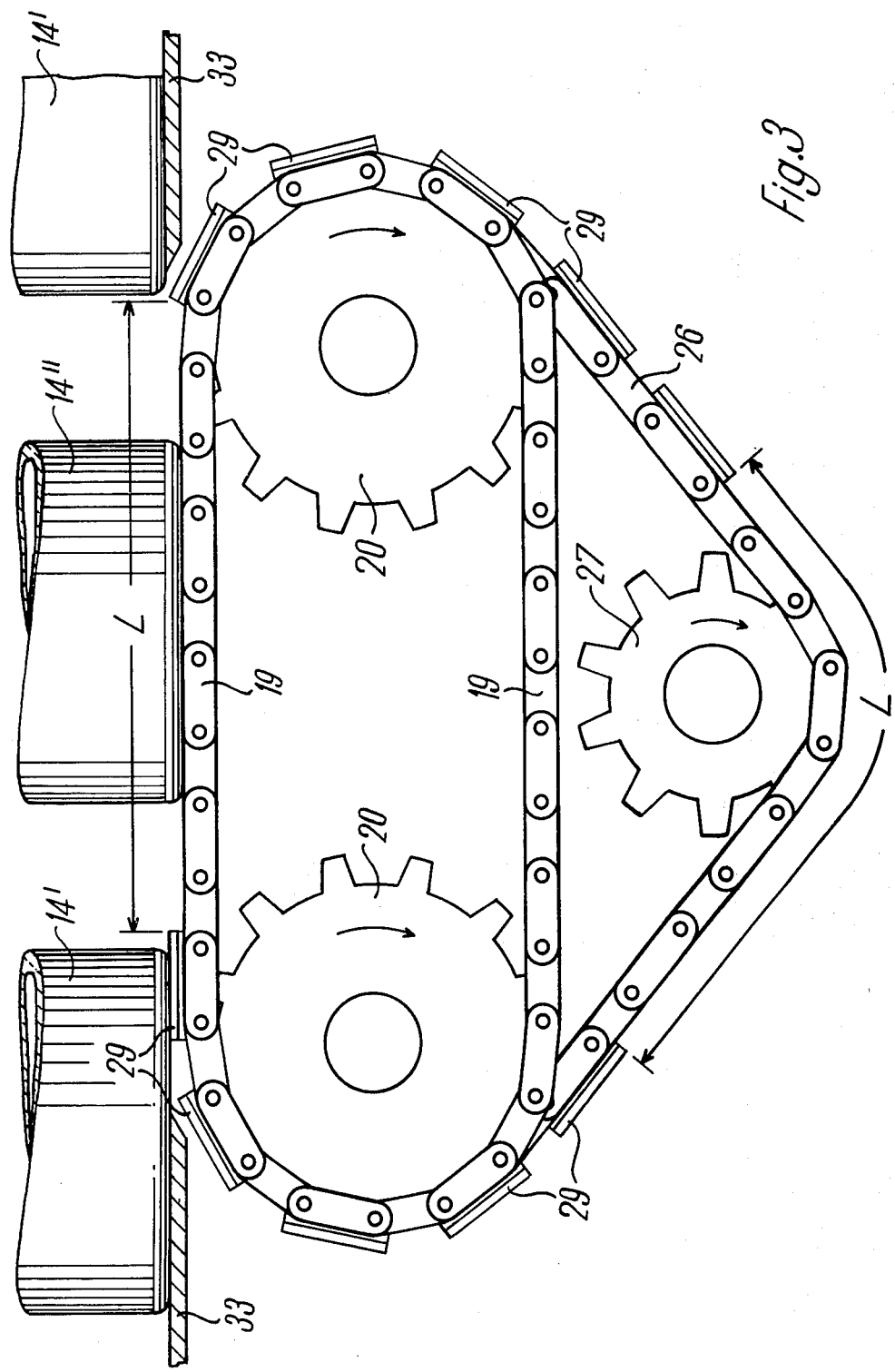
FIG. 3 is an elevation viewed in the direction of arrow III of FIG. 1.

The two sprocket wheels 20 are located a substantial distance apart. The portion 22 of each shaft 21 is embraced by a bearing bush 23 which, by way of a support arm 24, is mounted on a member secured relative to the machine, such as the housing of the weighing compartment 18. Two spaced sprocket wheels 25 are arranged on each bearing bush 23 are are freely rotatable parallel to one another. A support conveyor 26 in the form of two endless chains runs on the sprocket wheels 25, and the upper runs of the chains extend substantially parallel within the chains 19 of the weighing conveyor. In the present embodiment, and as may be seen particularly in FIG. 3, the support conveyor chains are guided around the two pairs of sprocket wheels 25 which are disposed substantially coaxially of the sprocket wheels 20, although the lower run of the chains run over additional drive sprocket wheels 27 which are disposed below the lower run of the weighing conveyor chains, and which can be driven separately and permit adjustment of tensioning of the support belt. However, it is also possible to guide the support conveyor chain in exactly the same way as the weighing conveyor chains and to dispose the drive sprocket wheels between the two sprocket wheels 25 or to effect the drive directly from the sprocket wheels 25.

The links of the chains of the support conveyor 26 have angled extensions or projections 29 in the form of angled members which are either mounted onto the links or are formed integrally therewith. They are arranged on the outsides of the support chains and in each case extend across the weighing conveyor chains 19 at a short distance therefrom. However, it may be seen particularly in FIG. 3 that the entirety of the support conveyor chains are not provided with the projections 29. Gaps, whose lengths are designated L, are provided between the individual portions of the support conveyor carrying the projections 29; the projections being sufficiently close together to be able to carry articles 14 on the projections. In the illustrated embodiment, two gaps L are provided on the support conveyor at diametrically opposite portions thereof. Slide bars 30 of a lifting device 31 extend one on each side of the weighing conveyor 19 and, when in their normal position, which is that shown, extend somewhat below the upper surface of the weighing conveyor 19, although they are interconnected by a frame 32 which can be raised by a pneumatic, hydraulic or electrical lifting device (not illustrated) such that the upper surfaces of the slide bars 30 project somewhat above the carrying surface of the weighing conveyor.

The weighing apparatus is operated in accordance with the following method:

The transfer conveyor 15 having the fingers 16 pushes the products 14 onto the weighing apparatus by way of transfer plates 33. The transfer conveyor 15 is driven somewhat slower than the weighing conveyor 19, while the support conveyor 26 runs in synchronsim with the transfer conveyor 15. The distances F between the fingers are adjusted and synchronised with the support conveyor such that a product 14 either comes to rest on the projections 29 of the support conveyor as shown by products 14', or is located in a gap L as shown by the product 14", so that it stands on the weighing conveyor 19. For this reason, the chains of the support conveyor 26 are offset somewhat downwardly relative to the surface of the weighing conveyor 19.

Owing to the fact that the weighing conveyor 19 runs more rapidly, the article 14" is displaced forwardly relative to the support conveyor and also relative to the other products 14' and, in particular, relative to the fingers 16, so that it is released from the finger 16'. The gap L is sufficiently large to permit the relative forward movement of the article 14" in the gap without the article running onto the projections 29 at the end of the gap. The transfer conveyor and the weighing apparatus 11 are aligned relative to one another such that there is produced between their conveying directions a small angle a by reason of which the article 14" also moves from the run of the transfer conveyor 15, so that the article stands freely on the weighing conveyor 19 during the weighing operation and the latter is unaffected by the transfer conveyor.

During conveyance to the discharge conveyor 13, the finger 16 finally catches up with the product again and pushes it across on to the conveyor. The discharge conveyor then pulls the product out of the gap F and conveys it away.

Thus, the products 14' travel across the weighing conveyor without being weighed. The distance between the undersides of the projections 29 and the upper surface of the weighing conveyor 19 on the one hand, and the distance between the internal diameter of the bush 23 and the external diameter of the shaft portion 22 on the other hand, are so small that the very slight vertical weighing movement therein can be effected in a troublefree manner.

The illustrated apparatus is designed such that six compartments of the transfer conveyor cross the weighing station at any one time so that six articles are in transfer at any one time. Since the support conveyor has two gaps L, every third product is weighed. It will be understood that, with the close sequence of the products caused by the high output of the automatic glass-blowing machine, it would not be possible to weigh all the articles, since several articles are located above the weighing conveyor at any given time. However, by virtue of the fact that they are supported on the support conveyor, only some of the products are tested by weighing, namely in a fixed sequence.

In the illustrated sequence in which each third article is weighed, it is also possible to regulate a machine which has, for example, two stations to be regulated (such as two globule formers in the case of an automatic glass-blowing machine). In this case, of each two successive products transferred, one product would originate from one of the manufacturing stations and the next product would originate from the other station, so that, in this case also, one product would be tested at one station and one product would be tested at the next station in each case, although each product located therebetween would be omitted from the test. In the case of three manufacturing stations, it would be possible to transfer to weighing every fourth article. The condition for the sequence of the products to be weighed can be as follows: n+1 or n−1, or a multiple thereof, when n is an even number of stations, or 1,3,5 . . . with an uneven number of stations.

The slide bars serve for the calibration operation. The frame and thus the slide bars 30 are raised by the lifting mechanism when a calibration operation is to be performed, so that they now also carry the articles 14′ otherwise carried by the weighing conveyor 19. The weighing conveyor thus remains unloaded, and the calibration operation can be performed automatically by internal application of weight in the weighing compartment. It will be appreciated that it is also possible to provide the slide bars at some other location, for example, between the two support chains or weighing conveyor chains, or to replace them by a rotating conveyor when very sensitive products are involved. However, the fingers 16 ensure that the products are conveyed in a reliable manner even when slide bars are provided. It is also possible to modify the other parts of the apparatus in many ways. Thus, for example, the support conveyor might be replaced by a conveyor having slide bars. It is also possible to construct the support conveyor without the projection 29 overlapping the weighing belt. However, the projections have the advantage that they protect the weighing conveyor against dirt and the effect of heat. The support conveyor can be readily cooled by providing in, for example, the region of the lower run, a cooling device which operates by contact or by heat transfer media such as air or liquid. On the other hand, it is virtually impossible to cool the weighing conveyor in this way, since this would falsify the weighing result. The heat acts upon a different location on the weighing conveyor at any given time owing to the differing speeds of the weighing conveyor and the support conveyor, so that the thermal stress can be substantially reduced.

It is also possible to allow the weighing conveyor to run between two endless members of the support conveyor, or to construct either of the two conveyors only as a single endless member device. The embodiment using chains as the endless members is necessary or desirable for articles having a high temperature. However, any other type of endless members such as belts, bands or the like are suitable for other uses. A weighing apparatus is provided which can weigh a continuous line of products which arrive in so close a succession and at such small distances apart that they could not otherwise be weighed at all, since the transient weighing times of the balance required in the small gaps between the individual products would not be met. It will be appreciated that it is also possible to work with only one or several gaps L in the support conveyor.

As is generally entirely adequate for the series testing of mass-produced articles, only some of the products are weighed in the case of the present invention. When, in individual cases, it is necessary to weigh all the products moving along the conveying path, or, for example, every second product is to be weighed in the case of conveyors moving very rapidly, although only every fourth product can be weighed on the weighing apparatus due to the time required for a weighing operation, several weighing apparatuses can be arranged one behind the other, wherein each weighing apparatus disposed downstream weighs the products which were carried by the support devices on the preceding balances, and which were not weighed. This is readily possible, since a constant sequence of weighed and non-weighed products is maintained on each weighing apparatus.

I claim:

1. A weighing apparatus, for successively conveyed articles, comprising:
   a weighing conveyor;
   weighing means operatively associated with the weighing conveyor; and,
   a support conveyor for carrying selected articles of the successively conveyed articles parallel to and out of contact with the weighing conveyor, the support conveyor having means for supporting the selected articles selectively arranged on the support conveyor, such that unselected articles, which arrive at positions between the supporting means, are carried by the weighing conveyor, whereby only a predetermined proportion of articles is weighed.

2. Weighing apparatus as claimed in claim 1, wherein the support conveyor comprises at least one endless conveyor which extends substantially parallel to the weighing conveyor and provides at least one portion for supporting an article.

3. Weighing apparatus as claimed in claim 2, wherein said at least one portion of the support conveyor extends above the plane of the weighing conveyor.

4. Weighing apparatus as claimed in claim 3, wherein said at least one portion of the support conveyor is a projection which passes over and across the weighing conveyor.

5. Weighing apparatus as claimed in claim 4, wherein the support conveyor comprises chains, having links on which are arranged the at least one projection, being in the form of an angled member.

6. Weighing apparatus as claimed in claim 1, wherein the weighing conveyor comprises a plurality of endless members arranged parallel to one another.

7. Weighing apparatus according to claim 6, wherein the support conveyor comprises a plurality of endless members arranged parallel to one another.

8. Weighing apparatus as claimed in claim 7, wherein the weighing and support conveyors are each endless conveyors comprising guide and drive wheels, and the guide and drive wheels of the support conveyor are arranged substantially coaxially with the guide and drive wheels of the weighing conveyor.

9. Weighing apparatus as claimed in claim 8, wherein the support conveyor has one of an additional guide or drive wheel arranged below the weighing conveyor.

10. Weighing apparatus as claimed in claim 1, further comprising a transfer conveyor for transferring the articles from a forwarding conveyor to the weighing conveyor and from the weighing conveyor to a discharge conveyor, the apparatus being arranged so to support conveyor runs synchronously with the transfer conveyor.

11. Weighing apparatus as claimed in claim 10, wherein the weighing conveyor is arranged to run somewhat more rapidly than the transfer conveyor, and wherein the support conveyor comprises at least one gap between the supporting means in which it does not support one of the selected articles, and whose length in the conveying direction is sufficiently longer than that of the article to ensure that the product to be weighed remains free of contact with the transfer and support conveyors within the gap during the entire weighing operation.

12. Weighing apparatus as claimed in claim 1, further comprising an actuable lifting device, which during a re-calibration operation, carries the unselected articles which would otherwise be weighed.

13. Weighing apparatus as claimed in claim 12, wherein the lifting device comprises raisable slide bars.

14. Weighing apparatus as claimed in claim 13, wherein the slide bars are arranged on each side of the weighing conveyor.

15. Weighing apparatus as claimed in claim 1, wherein the support conveyor and the weighing conveyor move continuously.

* * * * *

UNITED STATES PATENT AND TRADEMARK OFFICE
CERTIFICATE OF CORRECTION

PATENT NO. : 4,238,027
DATED : December 9, 1980
INVENTOR(S) : Burkhard Oelte

It is certified that error appears in the above-identified patent and that said Letters Patent are hereby corrected as shown below:

In the Assignee's name at the title page, left column, line 6, delete "Beuhler" and insert --Buehler--.

Signed and Sealed this

Twenty-first Day of April 1981

[SEAL]

Attest:

RENE D. TEGTMEYER

Attesting Officer     Acting Commissioner of Patents and Trademarks